United States Patent [19]
Deutsch

[11] 3,809,149
[45] May 7, 1974

[54] METHOD OF SUPPORTING A HOT OIL PIPELINE THROUGH PERMAFROST

[76] Inventor: Daniel H. Deutsch, 141 Kenworthy Dr., Pasadena, Calif. 91105

[22] Filed: Oct. 4, 1972

[21] Appl. No.: 294,790

[52] U.S. Cl................ 165/1, 165/46, 165/134, 165/135, 166/DIG. 1, 62/260
[51] Int. Cl.............................................. F28f 7/00
[58] Field of Search . 165/1, 45, 185, 183, 134–136, 165/181, 182; 62/260; 166/DIG. 1

[56] References Cited
UNITED STATES PATENTS
2,858,111  10/1918  Stebbing............................ 165/181
3,680,631  8/1972  Allen et al. ................... 166/DIG. 1

Primary Examiner—Charles Sukalo
Attorney, Agent, or Firm—Edgar W. Averill, Jr.

[57] ABSTRACT

An underground hot oil pipeline is maintained in a stable location by maintaining the permafrost in a frozen condition. This frozen condition is maintained by a combination of insulation means to reduce heat loss from the pipeline into the permafrost to below about 1 calory per square centimeter per day and by the provision of a plurality of elongated thermally conductive strips extending outwardly from the exterior of the pipeline insulating means in order to conduct that heat which flows from the immediate region of the pipeline insulating means into the surrounding permafrost. Above ground heat radiating means may be advantageously utilized to help conduct heat into the surrounding atmosphere.

11 Claims, 5 Drawing Figures

PATENTED MAY 7 1974  3,809,149

METHOD OF SUPPORTING A HOT OIL PIPELINE THROUGH PERMAFROST

BACKGROUND OF THE INVENTION

The discovery of large oil reserves in arctic regions such as those located on the north slope of Alaska has created a need to transport the oil to market. Because of the inaccessibility of the north slope to seagoing tankers during much of the year, it has been proposed to construct a pipeline from the north slope to the Port of Valdez on Alaska's sourthern shore. This proposed pipeline would be 789 miles long and a majority of the ground along the proposed route is composed of permafrost. The initial heat of the oil together with the frictional heating caused by its flow along the pipe is expected to maintain oil temperatures in the pipeline in the neighborhood of 70° to 80° C. Since increased temperatures result in a decreased viscosity of crude oil and thus a decreased pumping cost, it is expected that any pipeline will be operated at relatively high temperatures.

Geological Survey Circular No. 632 by Arthur H. Lachenbruch entitled, "Some Estimates of the Thermal Effects of a Heated Pipeline in Permafrost" estimated that a 4-foot pipeline buried 6 feet in permafrost and heated to 80° C will thaw a cylindrical region 20–30 feet in diameter in a few years in typical materials. (See page 1 of this circular which is hereby incorporated by reference herein for the purpose of background information.) This thawing is expected to continue over the years and the above-identified circular concludes that a typical thawing depth at the end of the second decade of operation would be 40–50 feet near the southern limit of permafrost and 35–40 feet in northern Alaska. Although portions of the permafrost having a relatively low ice content (i.e., high soil or rock content) could still provide sufficient support for a hot oil pipeline, much of the permafrost, when melted, converts to a slurry which would flow like a viscous river. Even in relatively level areas, it is estimated that millions of cubic feet of mud could flow out over the surface causing the pipe either to rise to the surface or, if constrained, to become buried where it could continue to cause thawing and further flow resulting in a substantial disruption to the landscape. Still further, if any seismic movements took place, a further decrease in slurry viscosity would result, perhaps leading to a rapid movement of the thawed permafrost causing damage or breakage to the pipe or placing constrained portions of the pipe so far below the surface of the earth that any required repair would require an almost impossible excavation task.

While it has been suggested to insulate the pipeline in order to prevent this thawing, the above-cited circular concludes that the principal effect of insulating the pipe would be to increase oil temperatures rather than to decrease thawing. This circular concludes that an underground pipeline is not feasible in permafrost. While the original pipeline plans recommended that all but 5 percent of the line be buried, later plans suggest the following: 178 miles of the pipeline will be supported above the ground on cement stilts; 177 miles will lie on thick gravel pads; 70 miles will be buried with a jacket of insulation and; 364 miles will be buried without any special precautions. The "national interest" in minimizing the countries dependence on foreign oil has been one of the major motivations in permitting some potential environmental harm. This "national interest" is particularly important in the event of a potential future war. However, it is evident that an exposed pipeline is far more vulnerable to sabotage than is a buried one. Furthermore, concern has been expressed that an exposed 4-foot diameter pipeline laid on a gravel pad will form a barricade which will have harmful consequences on the environment. Still further, an above-ground pipeline must still be insulated from the permafrost requiring an elaborate and costly support system. Thus, for these and other reasons, it would be desirable that the entire pipeline be buried even that portion located through permafrost having a high ice content. It has been believed heretofor that heat loss through the insulation would have to be reduced to a rate so low that the cost of insulation would be prohibitively high. While refrigeration systems have been proposed to prevent thawing, once again, the cost of such systems is also impractical for any significant length of pipeline.

SUMMARY OF THE INVENTION

The present invention is for a system of maintaining an underground pipeline through permafrost while maintaining the permafrost in a frozen condition in which condition it has a high structural strength and an ability to both support the pipeline and to stay in a stable, non-flowable condition. No external refrigeration is needed. It has been discovered that by insulating a hot oil pipeline to an extent sufficient to substantially reduce but not eliminate heat flow through the insulation and providing conductive strips around and extending away from the pipeline and into the permafrost, that the permafrost can be kept from thawing for a useful period of time (e.g. 25 to 100 years). If the pipeline has a diameter of 4 feet, insulation means should be provided to reduce heat loss to a maximum of from 0.1 to 5 calories per square centimeter per day. The terminal conductive (e.g. metal) strips are preferably several feet in length and are placed perpendicular to the axis of the pipeline and below its horizontal plane. Their size and number should be sufficient to conduct that heat which flows through the insulation away from the immediate region of the hot pipeline and into the surrounding volume of ground thereby preventing thawing of the permafrost. By dispersing the heat over this large volume, the heat is capable of being conducted to the surface and dispersed into the air. By the use of the present invention it is possible to establish a thermal condition in which the permafrost remains frozen for the expected life of the pipeline.

The amount of heat conducted into the surrounding permafrost by the metal strips may be increased by providing a conductive ring or collar outside of the pipeline insulation. The metal rods should then be placed near or preferably attached to the ring so that heat flowing through the insulation could follow a heat conductive path through the metal rods into the permafrost.

The invention further contemplates an additional safety factor by encasing the pipeline and insulation in a frozen block of ice contained in a water-tight container which serves to contain any water that does melt. Preferably, a solute is added to the water before it is frozen into ice so that the melting point of the encasing ice will be a few degrees below 0° C and, therefore, this ice will melt before the surrounding permafrost. This ice, therefore, acts as a ballast to help prevent a thawing during a prolonged period of above-average temperature. A further safety factor can be combined with the metal conductive strips whereby the strips also function as supports from the outside of the insulation means and serve to hold the pipe in place in case of a leak or other occurrence which should result in a melting of the permafrost. Since the majority of the permafrost contains a rather high percentage of suspended or entrapped soil, the supports are generally needed to prevent the pipeline from floating rather than sinking. Metal strip driven into the surrounding permafrost could provide such support.

Since the permafrost regions exist in areas in which the surrounding air temperature is below freezing for most of the year, this air provides an available heat sink which can be utilized to maintain the permafrost in a frozen condition. By the addition of a series of radiators extending from the conductive members located on the exterior of the pipeline insulation, a larger amount of heat flow through the insulation can be permitted. Initially, it is necessary that these radiators be thermally connected to heat conductive member surrounding the insulation only during the periods of below freezing weather and, preferably, only when the surrounding air temperature is below the temperature of the conductive members. When the radiators are so controlled, it becomes possible to regenerate or refrigerate the surrounding permafrost during times of low air temperature so that the permafrost may remain frozen indefinitely even though a substantial amount of heat flows into it from the pipeline. Radiators may be particularly effective when used in combination with the above-described ballast system since the ballast may be designed so that it will require more heat than can flow through the insulation in one year to melt. Thus, by refreezing the ballast through the use of radiators, the surrounding permafrost may never be subjected to a temperature above the melting point of ice.

DESCRIPTION OF THE PREFERRED EMBODIMENTS

Figure 1:
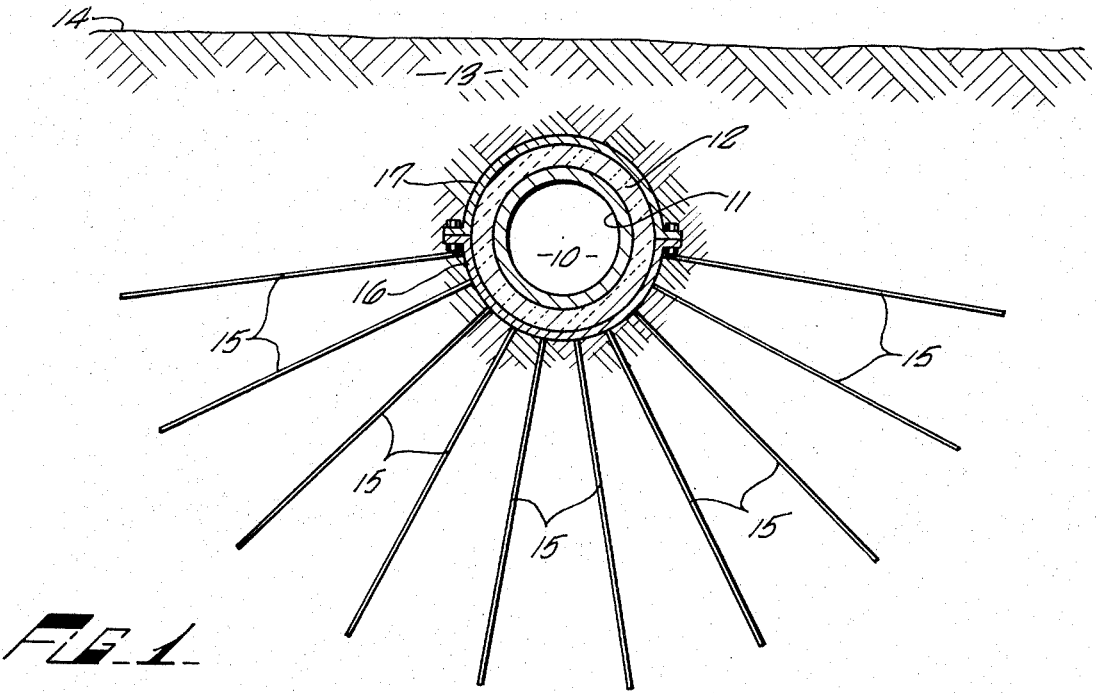
FIG. 1 is a cross-sectional end view of a hot oil pipeline supported in permafrost according to the present invention.

FIG. 1 shows hot oil 10 flowing within a steel pipeline 11 which is covered by a layer of insulation 12. While oil is mentioned herein as being held within pipeline 11, the present invention is, of course, applicable to any hot fluid and is not limited to crude oil. The insulated pipeline is located in permafrost 13 which has a ground level indicated by the reference character 14. A plurality of metal rods 15 extend radially outwardly and downwardly from lower ring half 16 which surrounds pipeline 11 and serve to conduct heat away from the region of the pipeline and into a large volume of permafrost 13. Upper ring half 17 is bolted to half 16 and serves to conduct heat to rods 15. By the combination of sufficient insulation and metal rods, the permafrost may be maintained in a permanently frozen condition for the expected service life of the pipeline.

The amount of insulation that is required is, of course, dependent upon the dimensions of the pipeline, the temperature of the permafrost and its thermal conductivity together with the outside temperature. In the case of a 4-foot diameter pipeline conducting oil at 70° C and permafrost at minus 10° C, the insulation should be sufficient to maintain the heat flow from the pipeline in the range of from about 0.1 to 5 calories per square centimeter per day. Various high efficiency insulations may be used to hold the heat loss to this relatively low value. One such insulation is a vacuum insulation made from a plurality of layers of reflective material and sold under the trade name Linde Super Insulation which consists of alternating layers of radiation shields and spacer materials operating in a high vacuum. In addition or alternatively, other high efficiency insulations may be used such as foamed plastic insulation (e.g. styrene foam or polyurethane foam) and these may be prefoamed or foamed in place. Since the heat conduction characteristics of insulation are well known, it is not believed necessary that an extensive discussion be included herein since the insulation requirements have been given.

Figure 2:
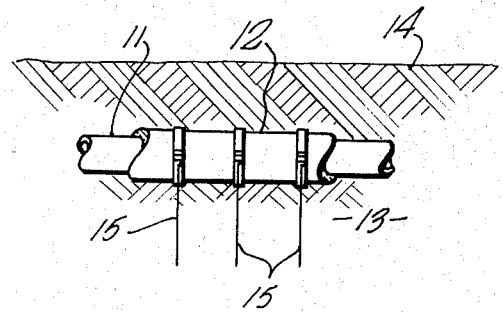
FIG. 2 is a side elevation of the pipeline of FIG. 1.

As shown in FIGS. 1 and 2, the metal rods 15 may be attached to a thermally conductive ring which preferably surrounds the insulation 12. While this conductive ring could be in the form of a continuous overlying cylinder, it is advantageous that a plurality of separate rings be used in order to confine the potential area of thawing in case of an oil leak.

Figure 3:
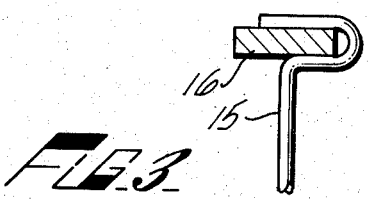
FIG. 3 is an enlarged view of that end of a conductive member which is adjacent to the hot oil pipeline of FIG. 1.

One method of affixing the metal rods 15 to ring half 16 is shown in FIG. 3. A U-shaped bend is formed in the end of rod 15 into which lower ring half 16 is inserted. Although it is preferable that rod 15 form a physical contact with ring half 16, this is not essential. It is desirable, however, that a relatively low resistance heat path be available between the rods and the lower ring half. In place of ring halves 16 and 17, a conductive wrapping, such as a metal foil or mesh could be used.

Figure 4:
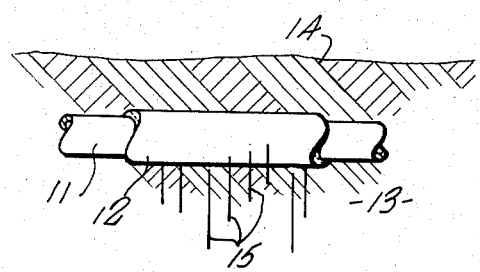
FIG. 4 is a side elevation showing an alternate location of conductive members along a hot oil pipeline.

The metal rods 15 which carry the heat from the immediate region of the pipeline may be from 2 to 20 feet in length with from 4 to 12 feet being preferred. The cross-sectional area may be between one-fourth of one square inch and 10 square inches. The cross-sectional shape of the rod may be round, rectangular and the center may be solid or hollow. The rods could also be thin strips. The rods should be made of a material having good heat conductivity such as iron, steel, aluminum or copper. The rods should be positioned in a horizontal or downward direction from the pipeline rather than upward since it is desired to maintain the ground above the pipeline in a frozen condition. The number of rods may vary between 1 and 42 per foot length of pipe and they are preferably spaced in a radiating pattern such as that shown in FIG. 1. They need not be attached to a conductive ring and they may be staggered as shown in FIG. 4 or in a common plane perpendicular to the central axis of the pipeline. If they are in a common plane, each plane should be spaced from one-half to 3 feet apart. A preferred configuration comprises a group of 10, 10-foot long 1-inch diameter iron rods located in a plane at a right angle to the axis of the pipeline and equally spaced starting at the horizontal.

Figure 5:
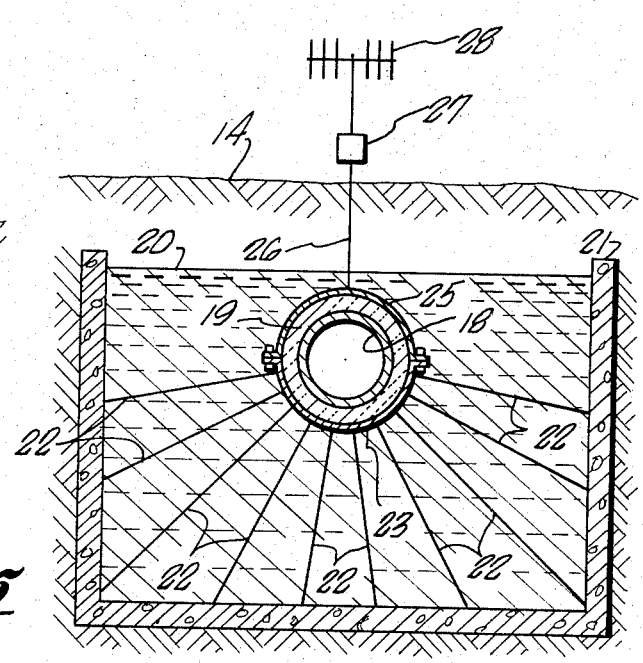
FIG. 5 shows a cross-sectional end view of a hot oil pipeline located in a watertight encasement.

An ice ballast is shown in FIG. 5 which surrounds pipeline 18 and insulation 19. The ballast is indicated by reference character 20. As stated above, this ballast may be encased in a watertight conduit such as a concrete conduit 21. The ballast may be added to the conduit after the pipeline has been placed therein and the ballast should then be allowed to freeze before covering the pipeline. The rods 22 extend radially outwardly from lower ring half 23 and terminate at the inner surface of conduit 21. Alternatively, they could be made to extend through the conduit into the permafrost 24.

Upper ring half 25 is thermally connected to a conductive member 26 such as a conductive metal rod. A thermally activated contact switch 27 connects member 26 to radiator 28. Radiator 28 may be made from a plurality of metallic plates or other relatively high surface member which increases heat flow from its surface into the atmosphere. Switch 27 may be merely a bimetallic strip which will form a physical contact when the temperature is below its set temperature (e.g. minus 10° C). An additional safety factor may be added by providing a second thermal switch in series with the first thermal switch.

The provision of a thermal path between the atmosphere and ballast 20 enables the ballast to be readily cooled during the cold winter months and thereby prevent thawing of the permafrost by the utilization of its heat of fusion. A solute such as ethylene glycol may be added to ballast 20 so that ballast 20 will melt at a temperature several degrees C below that of the permafrost and it will, thus, increase its effectiveness as a heat sink by its heat of fusion in that it will tend to melt before any of the permafrost will begin to melt.

The persent embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

I claim:

1. A method for supporting a hot, fluid-containing pipeline in permafrost comprising:
    surrounding said pipeline with insulating means sufficient to reduce heat flow through said insulating means to at least about 5 calories per square centimeter per day;
    inserting a plurality of heat conducting members extending outwardly and downwardly from the region of the exterior of said insulating means into said permafrost; and
    burying said pipeline and insulating means below ground level.

2. The method of claim 1 wherein said members are between 2 and 20 feet in length.

3. The method of claim 1 further including a heat conducting sheath surrounding at least a portion of the exterior of said insulating means and close enough to said members to form a heat conducting path from said sheath to said members.

4. The method of claim 1 wherein the number of said rods average between 1 and 42 per foot length of pipeline.

5. The method of claim 4 wherein said rods are placed in a planar group of from 3 to 21 spaced at from one-half to 3 foot intervals.

6. The method of claim 1 wherein said rods are about 10 feet in length.

7. The method of claim 1 further including the step of locating a watertight container between the exterior of said insulating means and said rods.

8. The method of claim 7 further including the step of adding water to said container and permitting said water to freeze before said burying step.

9. The method of claim 9 further including the step of adding a solute to said water to reduce the freezing point of said water.

10. The method of claim 9 wherein said solute is ethylene glycol.

11. A method for supporting a hot, fluid-containing pipeline in permafrost comprising:
    surrounding said pipeline with insulating means sufficient to reduce heat flow through said insulating means to at least about 5 calories per square centimeter per day;
    surrounding at least a portion of said insulating means with a heat conducting sheath;
    inserting a plurality of heat conducting members extending outwardly and downwardly from the region of the exterior of said insulating means into said permafrost and positioned so that the members form a heat conducting path with said sheath;
    connecting heat radiating means from said sheath into the atmosphere above said permafrost, said radiating means including switch means for interrupting the thermal path between said radiating means and said sheath when said atmosphere is warmer than a predetermined temperature; and
    burying said pipeline and insulating means below ground level.

* * * * *